(12) United States Patent
Gohr et al.

(10) Patent No.: US 9,731,691 B2
(45) Date of Patent: Aug. 15, 2017

(54) HYDRAULIC MASTER CYLINDER WITH BACK-UP RING

(71) Applicant: HB PERFORMANCE SYSTEMS, INC., Milwaukee, WI (US)

(72) Inventors: Jeffrey S. Gohr, Menomonee Falls, WI (US); Vesa Ahola, Oak Creek, WI (US); James Dimsey, Elm Grove, WI (US)

(73) Assignee: HB Performance Systems, Inc., Mequon, WI (US)

( * ) Notice: Subject to any disclaimer, the term of this patent is extended or adjusted under 35 U.S.C. 154(b) by 351 days.

(21) Appl. No.: 14/481,012

(22) Filed: Sep. 9, 2014

(65) Prior Publication Data

US 2015/0000265 A1    Jan. 1, 2015

Related U.S. Application Data

(63) Continuation of application No. 13/268,251, filed on Oct. 7, 2011, now Pat. No. 8,904,782.
(Continued)

(51) Int. Cl.
*B60T 11/26* (2006.01)
*F15B 7/08* (2006.01)
(Continued)

(52) U.S. Cl.
CPC ............ *B60T 11/165* (2013.01); *B60T 11/16* (2013.01); *B60T 11/22* (2013.01); *B60T 11/232* (2013.01);
(Continued)

(58) Field of Classification Search
CPC .................... B60T 11/16; B60T 11/165
(Continued)

(56) References Cited

U.S. PATENT DOCUMENTS 2,815,973 A    7/1955  Jackson
3,095,619 A    7/1963  Peterson
(Continued)

FOREIGN PATENT DOCUMENTS

WO    92/15474 A1    9/1992

OTHER PUBLICATIONS

Photographs of a brake master cylinder apparatus display model that was publically displayed in the United States as early as Jan. 1, 1998.
(Continued)

*Primary Examiner* — Thomas E Lazo
*Assistant Examiner* — Daniel Collins
(74) *Attorney, Agent, or Firm* — Husch Blackwell LLP

(57) ABSTRACT

Disclosed herein is a hydraulic master cylinder body having a bore defined at least in part by a bore wall, wherein the bore wall includes an opening for hydraulic fluid to be passed into the bore, and a piston assembly situated at least substantially in the bore, the assembly having a piston with a piston body and at least one cup seal situated substantially around the piston body, the cup seal situated adjacent to the bore wall so as to be in sealing engagement therewith, and a back-up ring that is situated about the piston body, wherein the back-up ring is positioned to at least partially cover a portion of the cup seal that is adjacent to the bore wall and to prevent at least a portion of the cup seal from contacting the bore wall and the opening for hydraulic fluid during piston actuation.

19 Claims, 10 Drawing Sheets

Related U.S. Application Data

(60) Provisional application No. 61/392,140, filed on Oct. 12, 2010.

(51) Int. Cl.
    *B60T 11/16* (2006.01)
    *B60T 11/232* (2006.01)
    *B60T 11/22* (2006.01)
    *B60T 11/236* (2006.01)
    *B62L 3/02* (2006.01)
    *F16D 65/28* (2006.01)

(52) U.S. Cl.
    CPC ............ *B60T 11/236* (2013.01); *B62L 3/023* (2013.01); *F16D 65/28* (2013.01)

(58) Field of Classification Search
    USPC .................. 60/585, 586; 277/437, 449
    See application file for complete search history.

(56) References Cited

U.S. PATENT DOCUMENTS

| | | |
|---|---|---|
| 3,188,099 A | 6/1965 | Johnson et al. |
| 3,257,152 A | 6/1966 | Vielmo et al. |
| 3,381,970 A | 5/1968 | Brown |
| 3,885,801 A | 5/1975 | Scannell |
| 3,930,657 A | 1/1976 | Svensson et al. |
| 4,040,636 A | 8/1977 | Albertson et al. |
| 4,189,287 A | 2/1980 | Sindelar |
| 4,281,590 A | 8/1981 | Weaver |
| 4,346,647 A | 8/1982 | Weaver |
| 4,468,042 A | 8/1984 | Pippert et al. |
| 4,516,785 A | 5/1985 | Miller et al. |
| 4,566,702 A | 1/1986 | Traub |
| 4,576,386 A | 3/1986 | Benson et al. |
| 4,630,833 A | 12/1986 | Boyle et al. |
| 4,635,945 A | 1/1987 | Beck |
| 4,987,739 A * | 1/1991 | Coleman ............. B60T 11/20 60/562 |
| 4,995,626 A | 2/1991 | Montague |
| 6,290,306 B1 * | 9/2001 | Friedow ................ B60T 8/32 303/113.3 |
| 6,651,429 B2 | 11/2003 | Ishiwata et al. |
| 2009/0152940 A1 | 6/2009 | Mercier et al. |

OTHER PUBLICATIONS

Engineering drawings of a brake master cylinder apparatus that was pubically displayed in both assembled and dissasembled form in the United States as early as Jan. 1, 1998.

Notification of Transmittal of International Search Report, International Application No. PCT/US2011/055360, dated Feb. 22, 2012, 10 pages.

* cited by examiner

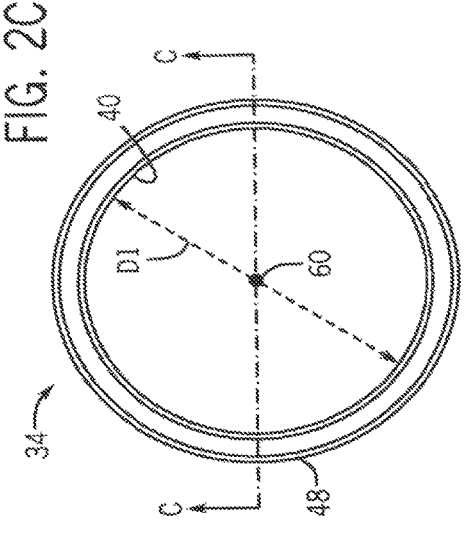
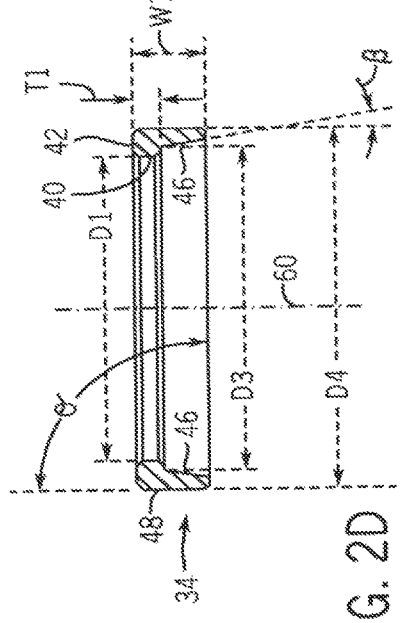
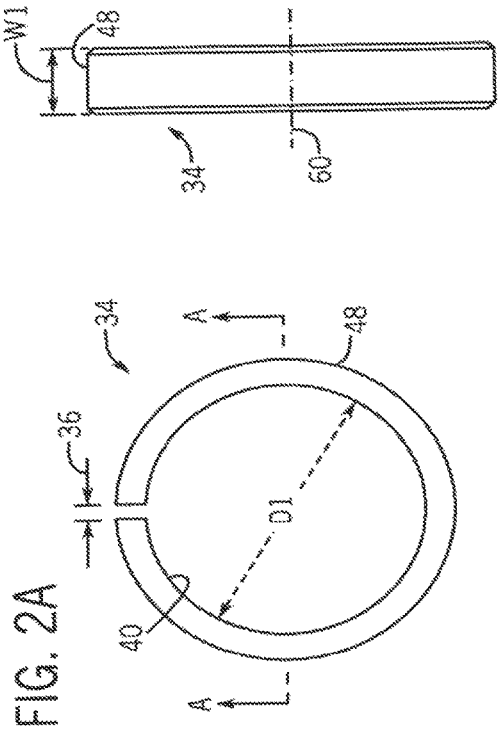
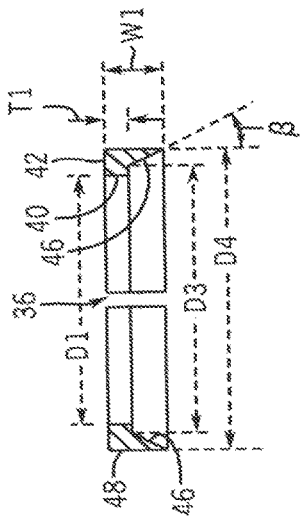

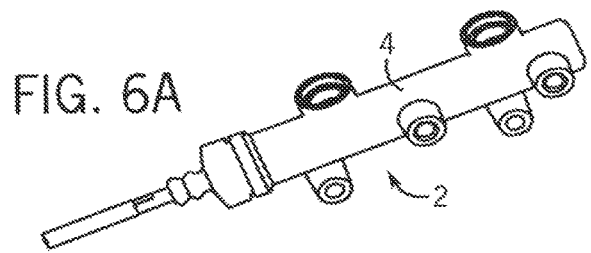
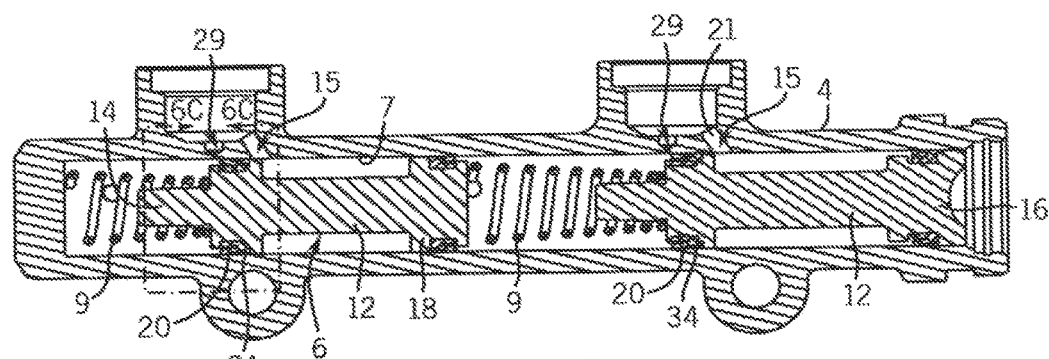
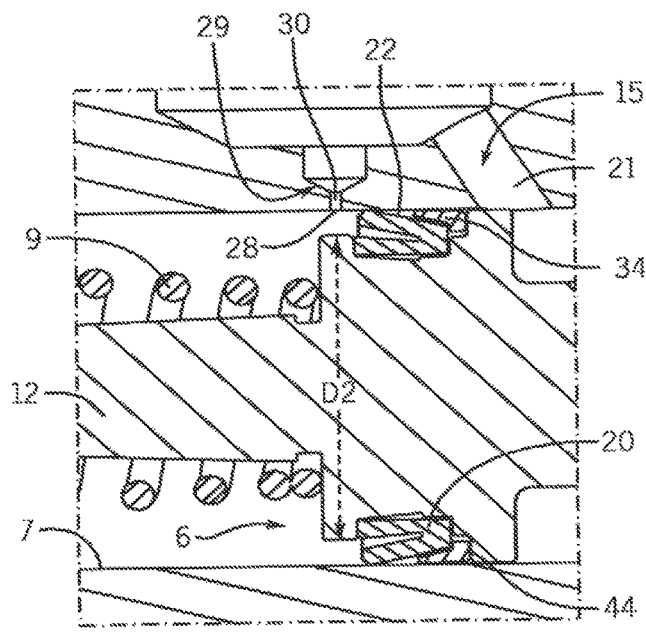

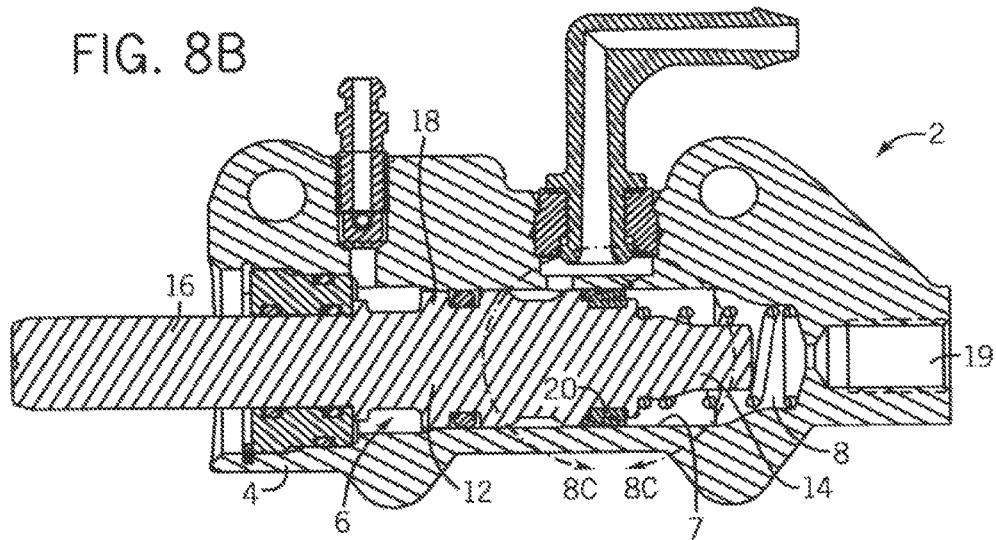
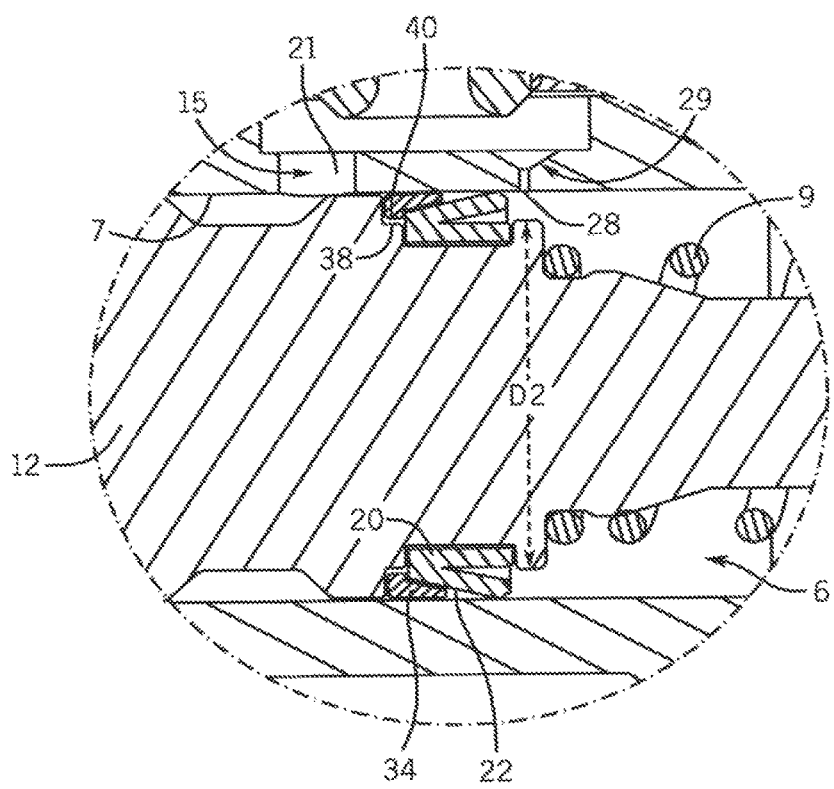

HYDRAULIC MASTER CYLINDER WITH BACK-UP RING

CROSS-REFERENCE TO RELATED APPLICATIONS

This application claims the benefit of U.S. non-provisional patent application Ser. No. 13/268,251, which was filed on Oct. 7, 2011 and entitled "Hydraulic Brake Master Cylinder with Back-Up Ring," and U.S. provisional patent application No. 61/392,140, which was filed on Oct. 12, 2010 and entitled "Hydraulic Brake Master Cylinder with Back-Up Ring," both of which are hereby incorporated by reference herein.

FIELD OF THE INVENTION

The hydraulic master cylinder with back-up ring relates generally to hydraulic brake master cylinders, and more particularly to piston sealing configurations in hydraulic brake master cylinders.

BACKGROUND OF THE INVENTION

Hydraulic brake systems are subjected to pressure created when brakes are applied. More particularly, applying pressure to the brake pedal of a braking system creates pressure in the master cylinder piston bore. In a traditional hydraulic braking system, the pressure created in the master cylinder piston bore is typically generated by a metal or plastic piston sealed by rubber cup seals, such as primary and secondary cup seals.

In higher pressure braking systems, such as Anti-lock Braking Systems (ABS), the pressure in the piston bore is significantly higher during braking operation than in a non-ABS application. In addition, when ABS is activated, the piston in the piston bore oscillates rapidly back and forth exerting substantial stress on the cup seals. The higher pressure, along with the violent reciprocation of the piston during ABS activation, can result in premature wear as well as damage to the cup seals, which can result in a catastrophic failure.

One method of accommodating the oscillating high-pressure effects of ABS is to utilize a central valve positioned inside the piston bore to adjust the internal pressure. The use of a central valve is well known in the art. Although the central valve can reduce the wear and damage of a cup seal by allowing bore cavity pressure to vent through the piston, numerous drawbacks exist with a central valve system. More particularly, a master cylinder assembly that utilizes a central valve contains several additional parts, which increase cost of manufacturing. In addition, the required valve actuation of the central valve can decrease the reliability of a master cylinder assembly, as additional moving parts are required to operate. Also, by adding the additional moving parts, various manufacturing tolerances are introduced that can create a large variation of dead-stroke among master cylinder assemblies manufactured under identical manufacturing specifications. Further, the use of a central valve can increase dead-stroke distance that a piston and a cup seal travel before pressure can begin to build, which reduces the responsiveness and firmness sought during actuation of the master cylinder assembly, leaving a less responsive and undesirable "spongy" feel when the braking system is actuated.

BRIEF SUMMARY OF THE INVENTION

In accordance with at least one embodiment, the hydraulic master cylinder with back-up ring relates to a hydraulic master cylinder body having a bore defined at least in part by a bore wall, wherein the bore wall includes an opening for hydraulic fluid to be passed into the bore, and a piston assembly situated at least substantially in the bore, the position assembly having a piston with a piston body and at least one cup seal situated substantially around the piston body, the cup seal situated adjacent to the bore wall so as to be in sealing engagement therewith, and further including a back-up ring that is situated about the piston body, wherein the back-up ring is positioned to at least partially cover a portion of the cup seal that is adjacent to the bore wall and to prevent at least a portion of the cup seal from contacting the bore wall during piston actuation.

In another embodiment, the hydraulic master cylinder with back-up ring relates to a method of operating a brake master cylinder that includes actuating a piston assembly having a piston and a cup seal, wherein the cup seal is in contact with a bore wall of the master cylinder, supporting at least a portion of the cup seal situated adjacent to the bore wall, passing the cup seal over a port timing hole opening in the bore wall during actuation of the piston; and preventing the at least a portion of the cup seal from extruding into the port timing hole opening during actuation of the piston.

In yet another embodiment, the hydraulic master cylinder with back-up ring relates to a brake master cylinder assembly that includes a hydraulic brake master cylinder body having a piston bore, a piston having a circumferential shoulder and a circumferential support wall; and a circular ring that further includes a tapered annular seal cover surface that extends between a first diameter and a second diameter, wherein the seal cover surface is configured to abut at least a portion of an outer wall of a cup seal, a first seating surface configured to mount onto the circumferential shoulder of the piston, wherein the ring is radially supported by the abutment of the first seating surface with the circumferential shoulder of the piston, and a second seating surface configured to abut the circumferential support wall of the piston, wherein the support wall laterally supports the ring during actuation of the piston.

Other embodiments, aspects, features, objectives, and advantages of the hydraulic master cylinder with back-up ring will be understood and appreciated upon a full reading of the detailed description and the claims that follow.

BRIEF DESCRIPTION OF THE DRAWINGS

Embodiments of the hydraulic master cylinder with back-up ring are disclosed with reference to the accompanying drawings and are for illustrative purposes only. The hydraulic master cylinder with back-up ring is not limited in its application to the details of construction or the arrangement of the components illustrated in the drawings. The hydraulic master cylinder with back-up ring is capable of other embodiments or of being practiced or carried out in various other ways. Like reference numerals are used to indicate like components. In the drawings:

FIG. 2A is a side view of one embodiment of an exemplary back-up ring for use in the assembly of FIG. 1A;

FIG. 2B is a cross-sectional view taken along A-A of FIG. 2A;

FIG. 2C is a side view of another embodiment of a hack-up ring;

FIG. 2D is a cross-sectional view taken along C-C of FIG. 2C;

FIG. 2E is a top view of the back-up ring shown in FIG. 2C;

FIG. 6A is a perspective view of still yet another exemplary hydraulic master cylinder assembly employing an exemplary back-up ring;

FIG. 6B is a cross-sectional side view of the hydraulic master cylinder assembly of FIG. 6A;

FIG. 6C is a close-up view of a portion of FIG. 6B;

FIG. 8B is a cross-sectional side view of the hydraulic master cylinder assembly of FIG. 8A; and FIG. 8C is a close-up view of a portion of FIG. 8B.

DETAILED DESCRIPTION OF THE PREFERRED EMBODIMENT

Figure 1A:
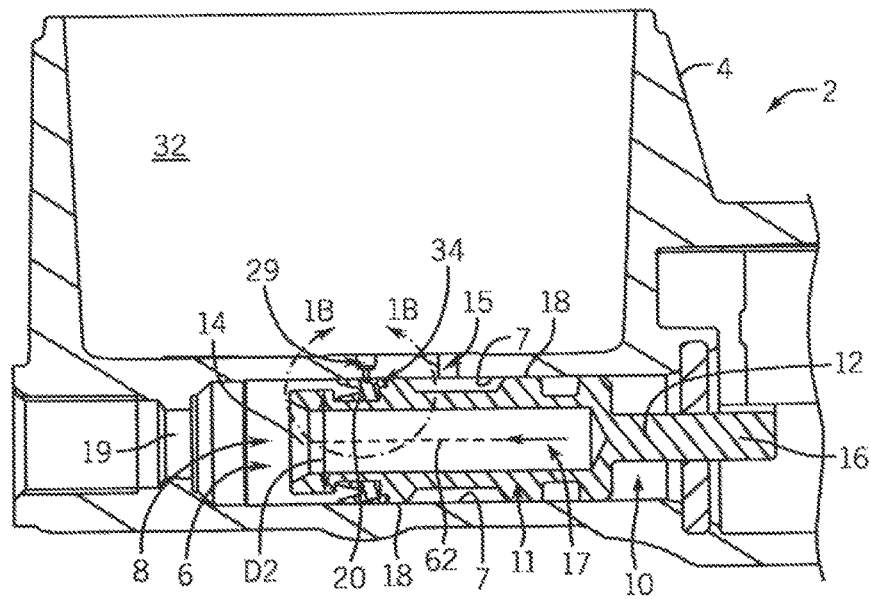
FIG. 1A is a cross-sectional side view of a portion of an exemplary hydraulic master cylinder assembly employing an exemplary back-up ring.
Figure 1B:
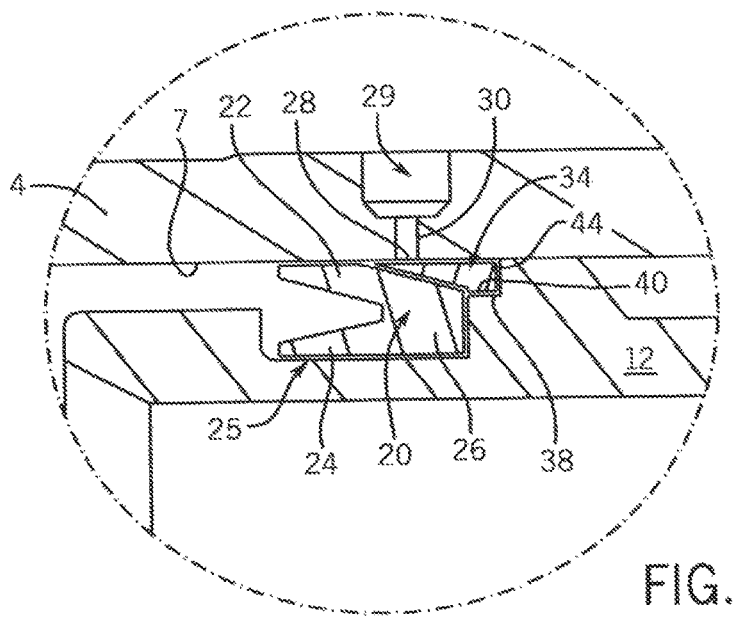
FIG. 1B is a close-up view of a portion of FIG. 1A.

Referring to FIGS. 1A and 1B, a cross-sectional side view of a portion of an exemplary hydraulic master cylinder assembly 2 is depicted in FIG. 1A that includes a body portion 4. The master cylinder assembly 2 can be part of a braking system for one or more of a variety of land-based vehicles, such as a motorcycle, automobile, snowmobile, All Terrain Vehicle (ATV), Utility Terrain Vehicle (UTV), motorized and non-motorized bicycles, etc. In the present embodiment, the master cylinder assembly 2 is provided for use with an Anti-Lock Braking System (ABS) for use with one or more of such land vehicles. The body portion 4 houses a piston bore 6 having a bore wall 7, a first bore end 8, and a second bore end 10. Although the body portion 4 can be an integral structure, it is contemplated that it can include two or more components secured together.

The master assembly 2 further includes a piston assembly 11 having a piston 12 positioned in the bore 6, the piston having a first piston end 14 and a second piston end 16. The first piston end 14 is situated inside the bore 6 adjacent the first bore end 8. The second piston end 16 is an actuating end and, as shown, is situated at least partially inside the bore 6 adjacent the second bore end 10. In addition, the second piston end 16 is in operable association with a brake actuator 9 (FIG. 4A), such as a brake lever or pedal, either directly or indirectly, wherein one or more components can be positioned in between the brake actuator 9 and the piston 12. When the brake actuator 9 is activated, the piston 12 is pushed inside the bore 6 along a direction indicated by arrow 17. This movement of the piston 12 creates a fluid pressure inside the bore 6 at the first bore end 8 as a result of the fluid (not shown) situated between the piston 12 and the first bore end 8. As the fluid has minimal compressibility, the fluid pressure in the bore 6 is conveyed out of the bore 6 at the first bore end 8, away from the piston 12, and downstream to one or more brake components (not shown) through a fluid channel 19. The brake components receiving the pressurized brake fluid act upon the piston 12, which in turn generates a clamp force on brake friction pads (not shown) that cause a drag on a spinning brake rotor secured to a wheel (not shown), thereby reducing wheel speed. Upon release of the brake actuator, a biasing element, such as a spring 9 (FIG. 4A) can be utilized to return the piston to its pre-actuated position. Further, the brake components are situated about the wheel(s) of the vehicle, where such components can include a brake caliper, brake cylinder, etc.

To maintain alignment of the piston 12 with the bore wall 7, the piston includes one or more guides 18 that are adjacent to the bore wall 7 and configured to slide along the bore wall 7 during movement of the piston 12 between the first bore end 8 and the second bore end 10. In addition, the dimensions of the guides 18 can serve to provide a desired path for the flow of brake fluid between the bore wall 7 and the piston 12, particularly when the bore 6 is being evacuated or filled with brake fluid. To further assist in sealing the piston 12 with respect to the bore wall 7, one or more cup seals 20 are provided. Further, and although not shown, one or more additional cup seal(s) can also be provided about the piston 12 to provide additional sealing. In accordance with at least some embodiments, the cup seal 20 is substantially circular in shape to accommodate the generally cylindrically shaped portion of the shape of the piston 12 about which it is positioned. The cup seal 20 typically comprises a pliable material, such as rubber, although other sealing materials can be utilized. The cup seal 20 has an outer wall 22 and inner wall 24, wherein the outer and inner walls are co-joined about a front cup portion 26. The front cup portion 26 and the inner wall 24 are substantially situated in a groove 25 that substantially encircles the piston 12. The outer wall 22 extends from the front cup portion 26 to an end that is in contact with the bore wall 7, thereby providing a fluid seal between the piston 12 and the bore wall 7. Further, the cup seal 20 is positioned about the piston 12 such that it intermittently covers an opening 28 of a port timing hole 29, which is formed in the body portion 4, as the piston 12 is moved. The port timing hole 29 includes a port timing hole passage 30 that extends from the bore 6 to a master cylinder reservoir 32. In addition, a compensation port 15 can be provided that includes a compensation port passage 21 that also extends between the bore 6 and the master cylinder reservoir 32.

The general principles of ABS are known to persons skilled in the art and as such, a detailed description of such principles is not provided herein. However, it is noted that during the application of an ABS, a high pressure oscillation of fluid occurs in the first bore end 8 between the first piston end 14 and the fluid channel 19. This oscillation causes the piston 12 and accordingly the piston front end 14 to move repeatedly towards and away from the first bore end 8 adjacent the fluid channel 19, first in the direction of arrow 17, followed by a movement in the opposite direction of arrow 17. During these high pressure episodes, the outer wall 22 of the cup seal is forcibly pushed against the bore wall 7 about the opening 28 of the port timing hole 29. The high pressure exerted by the fluid in the bore 6 against the cup seal 20 can result in the outer wall 22 of the cup seal being deformed by or extruded at least partially into the opening 28. This can result in the shearing off of a portion of the cup seal 20 as the piston 12 moves abruptly over the opening.

The use of a back-up ring 34 (discussed below) in a hydraulic master cylinder assembly 2 can extend the operational life of the cup seal 20. More particularly, without the back-up ring 34, the cup seal 20 has a greater propensity to tear as a result of exposure to the opening 28 in the port timing hole 29, this can result in a catastrophic failure of the hydraulic master cylinder assembly 2. By reducing or eliminating exposure of the cup seal 20 to the opening 28, degradation of the cup seal 20 can be reduced. In addition, such degradation of the cup seal 20 can result in decreased performance. Typically, the user can detect the decreased performance and will replace the cup seal 20 before complete failure occurs, although if the cup seal 20 has been fatigued by repeated extrusion into the opening 29, the cup seal 20 can fail prematurely, resulting in increased maintenance costs.

Further, as the use of the back-up ring 34 can significantly reduce the overall wear on the cup seal 20, particularly in a high-pressure ABS application, the life cycle threshold of the cup seal 20 can be significantly increased. In at least some embodiments, a cup seal lifecycle threshold of over 100,000 cycles can be achieved.

In addition to increased safety and durability, the use of the back-up ring 34 can reduce the manufacturing time for the hydraulic master cylinder assembly 2. For example, the supporting of the cup seal 20 provided by the back-up ring 34 reduces the force with which the cup seal 20 is pushed against the bore wall 7 during operation. This reduction in force allows for the bore wall 7 to be honed for a shorter period of time without suffering premature failure due to the increased particle wear as the cup seal 20 is moved along the bore wall 7.

Referring now to FIGS. 2A, 2B, 2C, 2D, and 2E, an exemplary back-up ring 34 is depicted. The back-up ring 34 is configured to limit the exposure of the cup seal 20 to the opening 28 by covering at least a portion of the cup seal 20 that would otherwise be exposed to the opening 28. The positioning of the back-up ring 34 prevents or partially prevents extrusion of the cup seal 20 into the opening 28. In at least some embodiments, the back-up ring 34 is sized and shaped to substantially or completely encircle the piston 12 and to substantially conform to the shape of the bore wall 7. The back-up ring 34 can be a molded, split, or solid ring, configured to fit around at least a portion of the outer wall 22 of the cup seal and sit on a shoulder 38 of the piston 12. The back-up ring 34 can be comprised or constructed of one or more materials, such as metal and plastic. In at least some embodiments, the back-up ring 34 can include a non-ferrous metal that is compatible with both brake fluid and the composition of the bore 6. In at least some embodiments, the back-up ring 34 can be comprised of brass and utilized with an aluminum bore 6. In at least some other embodiments, the back-up ring 34 can include a plastic, such as an acetyl resin, for example, the compositions identified as Delrin 500AF and Delrin 500CL, which are manufactured by DuPont, located in Wilmington, Del. USA.

As seen in FIGS. 2A and 2B, the back-up ring 34 can include a separating passage 36 therethrough for bending and/or expanding the back-up ring 34 to pass over the piston 12 during installation onto the shoulder 38. In at least some embodiments, the separating passage 36 can be omitted (FIGS. 2C-2E) to form a continuous loop. Further, in at least some embodiments, the back-up ring 34 includes the first seating surface 40 that is configured to sit atop the shoulder 38 (FIG. 1B) of the piston 12, and a second seating surface 42 that abuts a support wall 44 (FIG. 1B) of the piston 12, where the support wall 44 extends substantially perpendicular to the bore wall 7 and the shoulder 38. Positioning the back-up ring 34 on the piston 12 as such serves to substantially limit movement of the back-up ring during movement of the piston 12, as discussed in detail below.

The back-up ring 34 includes an annular seal cover surface 46 that abuts at least a portion of the outer wall 22 of the cup seal 20, and in some embodiments is configured to be tapered to substantially match the tapering of the outer wall 22 of the cup seal 20. The seal cover surface 46 limits the cup seal's deformation when the cup seal 20 is under pressure, by providing a rigid surface to support at least a portion of the outer wall 22 of the cup seal 20. The back-up ring 34 also includes a guide surface 48 situated along an outer circumference of the back-up ring. As seen in FIGS. 1A and 1B, when the back-up ring is in position in the bore 6, the guide surface 48 is situated adjacent to the bore wall 7 and as such, serves to limit or prevent contact between at least a portion of the outer wall 22 of the cup seal 20 and the bore wall 7, as the cup seal 20 passes over the opening 28. A portion of the outer wall 22 that is not covered by the back-up ring provides sealing and passes over the opening 28 during initial actuation of the piston 12. As the piston 12 is further actuated, the pressure in the first bore end 8 increases and the portion of the outer wall 22 that is covered by the back-up ring 34 passes over the opening 28. In this regard, the cup seal 20 can still provide a fluid seal, while still being protected by the back-up ring 34.

In addition, the use of the back-up ring 34 allows the use of a cup seal designed for lower pressure braking systems in a severe duty and/or higher pressure system, thereby allowing a single cup seal part to be supplied for use in multiple braking systems. As discussed below, the back-up ring can be sized and shaped to accommodate various components, such as pistons 12, bores 6, and cup seals 20 having dimensions that include dimensions not discussed or depicted herein. Further, although the back-up ring 34 has been described for use in a high pressure ABS application, the back-up ring can be utilized in other types of braking systems applications, such as non-ABS and low pressure systems.

Referring to FIGS. 2A, 2B, 2C, 2D), and 2E, the back-up ring 34 can include numerous dimensional variations. In at least some embodiments, the first seating surface 40 has a thickness T1 of about 0.035+/−0.005 inches and a diameter D1 of about 0.470+/−0.005 inches. The diameter D1 of the first seating surface 40 is sized to equal or exceed an outside diameter D2 (FIGS. 4C, 5C, 6C, 7C, 8C) of the first piston end 14, such that the back-up ring 34 can be slid over the first piston end 14 and onto the shoulder 38. As seen in FIGS. 2B and 2D, the seal cover surface 46 can be tapered and extends between a first diameter D3 and a second diameter D4. In at least some embodiments, the first diameter D3 is equal to about 0.500+/−0.005 inches and the second diameter D4 is equal to about 0.577+/−0.005 inches.

Further, the guide surface 48 is sized to fit inside the piston bore 6 and can be tapered as well. The guide surface 48 has a width W1 (FIG. 2E) and in at least some embodiments, the width W1 is about 01.00+/−0.005 inches. The back-up ring 34 includes a longitudinal ring central axis 60, and when the back-up ring 34 is installed, the ring central axis 60 is coincident or substantially coincident with a central longitudinal axis 62 of the piston. Additionally, the guide surface 48 can be offset from the ring central axis 60, such that only a portion of the guide surface 48 abuts the piston wall 7. In at least one embodiment, a guide surface offset θ that extends between a line along the guide surface 48 and a line extending across the diameter D1 and perpendicular to the ring central axis 60, is equal to about 89+/−1.0 degrees.

Further, the seal cover surface 46 of the back-up ring 34 that extends between the first diameter D3 and the second diameter D4 can include a seal cover surface offset β that extends between a line along the seal cover surface 46 and a line extending parallel to the ring central axis 60 and along the first seating surface 40. The seal cover surface offset β, is in at least some embodiments, equal to about 15+/−2.0 degrees. Further, the seal cover surface offset θ can be modified to accommodate various cup seal styles, shapes, materials, thicknesses, etc.

Figure 3A:
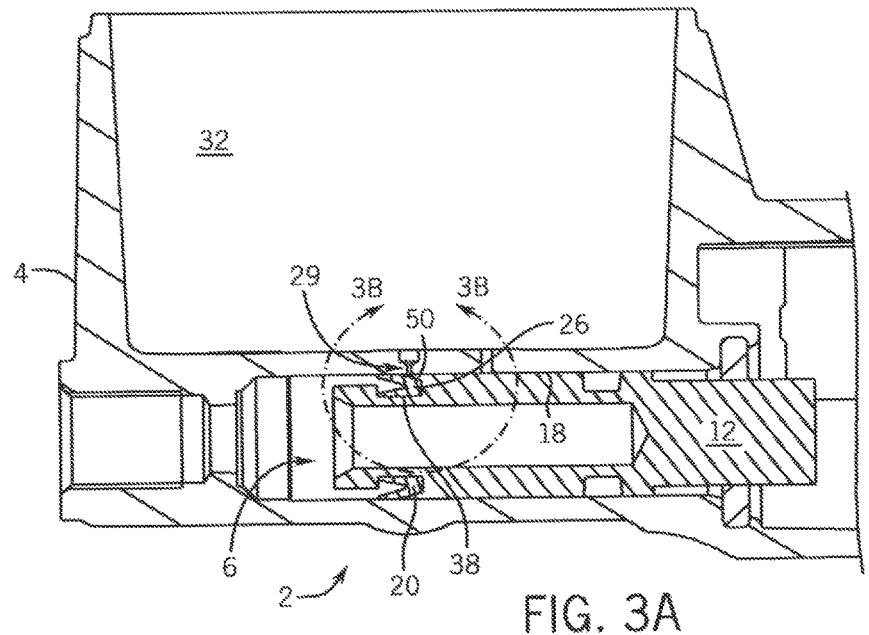
FIG. 3A is a cross-sectional side view of a portion of an exemplary hydraulic master cylinder assembly employing an exemplary integrated back-up ring.
Figure 3B:
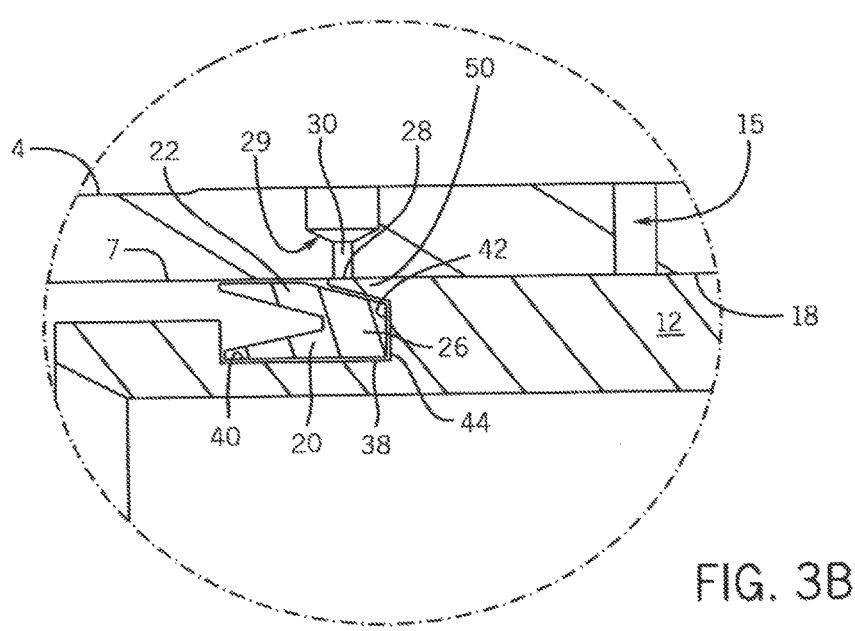
FIG. 3B is a close-up view of a portion of FIG. 3A.

Referring now to FIGS. 3A and 3B, another exemplary hydraulic master cylinder assembly 2 is provided wherein the piston 12 includes an integral back-up ring 50 in accordance with other embodiments of the hydraulic master cylinder with back-up ring. The back-up ring 50, as shown, extends integrally from one or more of the guides 18 that encircles the piston 12, as such, the back-up ring 50 in combination with one or more guides 18 can take the form of a sleeve or sleeve-like structure with the back-up ring 50 forming at least in part, a protrusion extending from the piston. As shown in FIG. 3A, the back-up ring 50 is formed adjacent to the front cup portion 26, and is configured to extend the guides 18 of the piston 12 to at least partially cover the outer wall 22 of the cup seal 20, while allowing space for the cup seal 20 to be positioned as expected about a typical piston 12. The embodiment in FIG. 3A serves to provide an efficient design that obviates the need for a back-up ring that is removably positioned about the piston 12, thereby reducing the quantity of individual components and the time required for installing the piston 12.

In addition, although the piston 12 is shown to comprise two guides 18, which are shown encircling the piston in FIG. 3A, fewer or greater number of such surfaces can be utilized and, accordingly, sized to extend along various lengths of the piston 12. For example, in some embodiments, a single guide 18 can extend around the piston 12, and in other embodiments, several guiding surfaces each appropriately spaced apart about the length of the piston can be used. Still further, in other embodiments, the back-up ring 50 can be configured into a different position about the guiding surface or duplicated to accommodate a secondary cup seal (not shown) situated on the piston 12. Additionally, in at least some embodiments, the piston 12 can comprise a thermoplastic piston material, although other materials can be used, such as steel and aluminum.

Figure 4A:
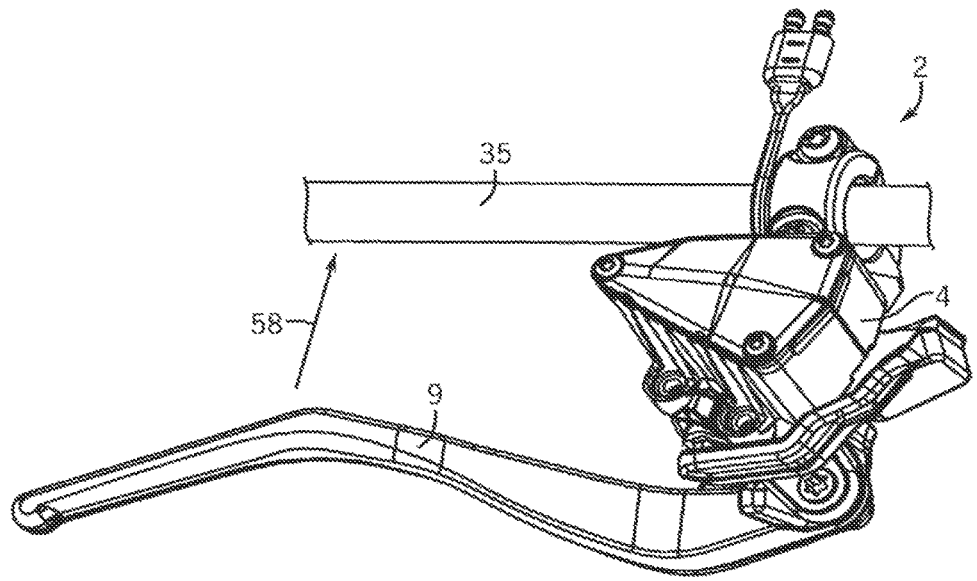
FIG. 4A is a perspective view of another exemplary hydraulic master cylinder assembly employing an exemplary back-up ring.

Referring now to FIGS. 4A-8B, the back-up ring 34 can be utilized in numerous embodiments of master cylinder assemblies. FIGS. 4A-8B are provided to illustrate various exemplary embodiments of hydraulic master cylinder assemblies 2 that can employ the back-up ring 34. More particularly, FIG. 4A is a perspective view of a radial hand-brake hydraulic master cylinder assembly 2 employing the back-up ring 34, wherein the radial hydraulic master cylinder assembly 2 is configured to be mounted on the handlebar 35 of various vehicles, such as a motorcycle, bicycle, All Terrain Vehicle (ATV), snowmobile, etc. The radial hand-brake hydraulic master cylinder assembly 2 includes a bore 6 that extends longitudinally parallel to the brake actuation direction 58 (lever pull) and perpendicular to the handlebar 35. In addition, the bore 6 is situated at an angle to the horizontal plane.

Figure 4B:
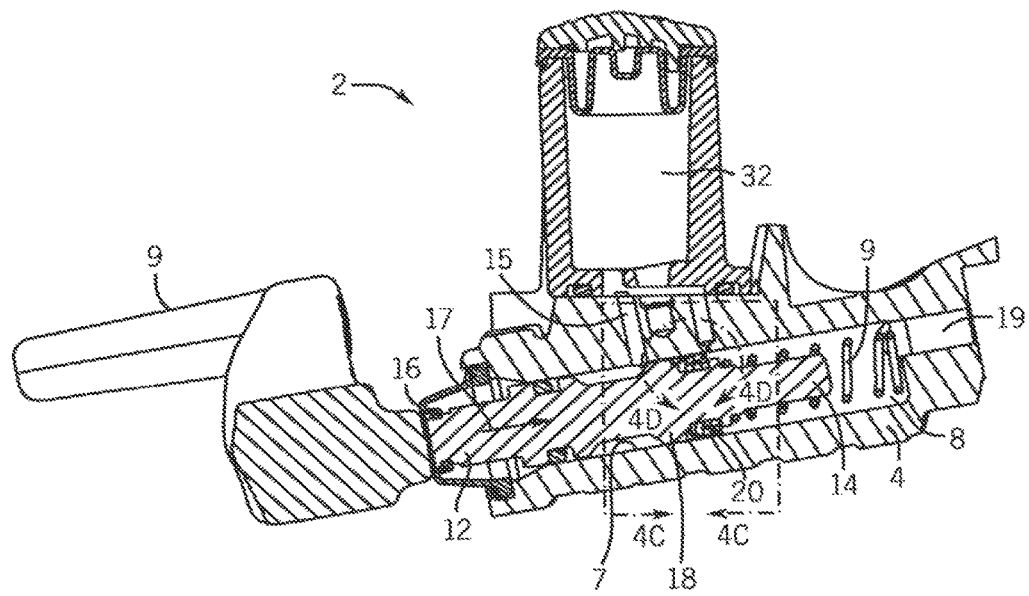
FIG. 4B is a cross-sectional side view of the hydraulic master cylinder assembly of FIG. 4A.
Figure 4C:
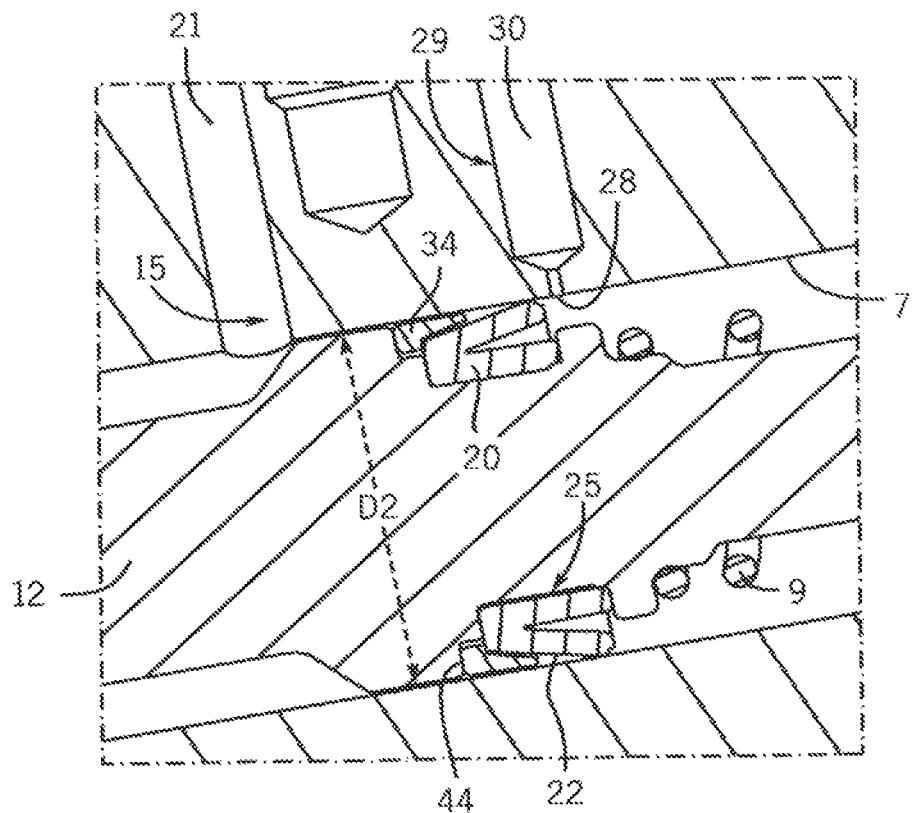
FIG. 4C is a close-up view of a portion of FIG. 4B.
Figure 4D:
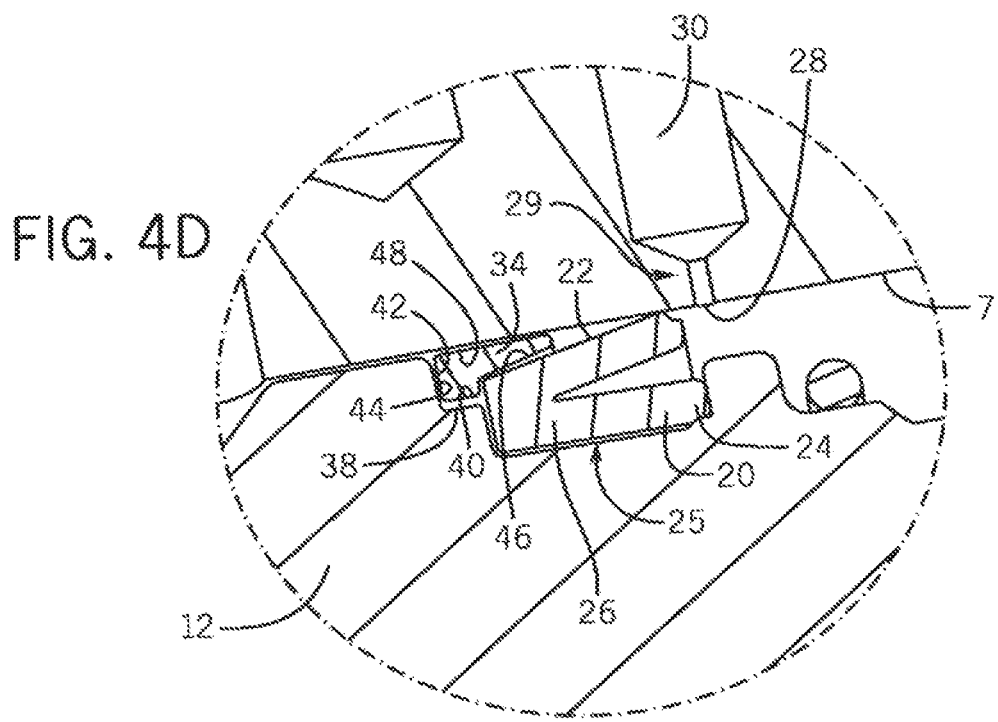
FIG. 4D is close-up view of another portion of FIG. 4B.

FIG. 4B is a cross-sectional side view of the radial hand-brake hydraulic master cylinder assembly 2 of FIG. 4A. FIG. 4C is close-up views of portions of FIG. 4B. FIG. 4D is another close-up view of a portion of FIG. 4B more particularly identifying the interface of the back-up ring 34 with the piston 12. FIGS. 5A-8B do not include an additional close-up view having the detail of FIG. 4D, although it is to be understood that the interface of the back-up ring 34 and piston 12 shown in FIG. 4D, namely at least, the shoulder 38, the first seating surface 40, the second seating surface 42, and the support wall 44, are similar to or the same as the back-up ring 34 and piston 12 interface of each of the embodiments shown in FIGS. 1A, 1B, and 5A-8B.

Figure 5A:
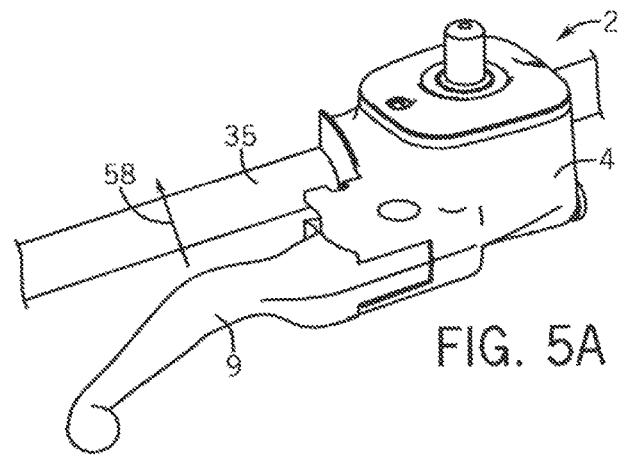
FIG. 5A is a perspective view of yet another exemplary hydraulic master cylinder assembly employing an exemplary back-up ring.
Figure 5B:
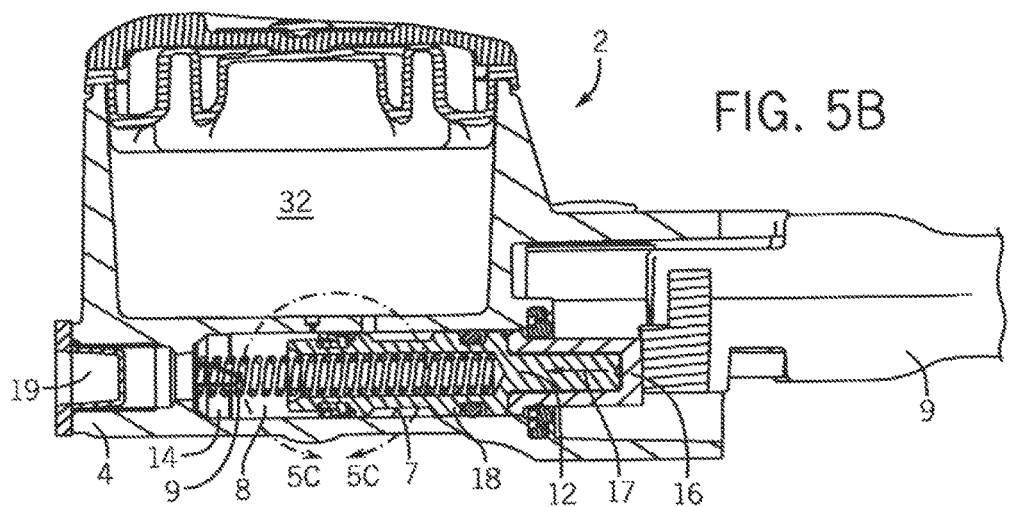
FIG. 5B is a cross-sectional side view of the hydraulic master cylinder assembly of FIG. 5A.
Figure 5C:
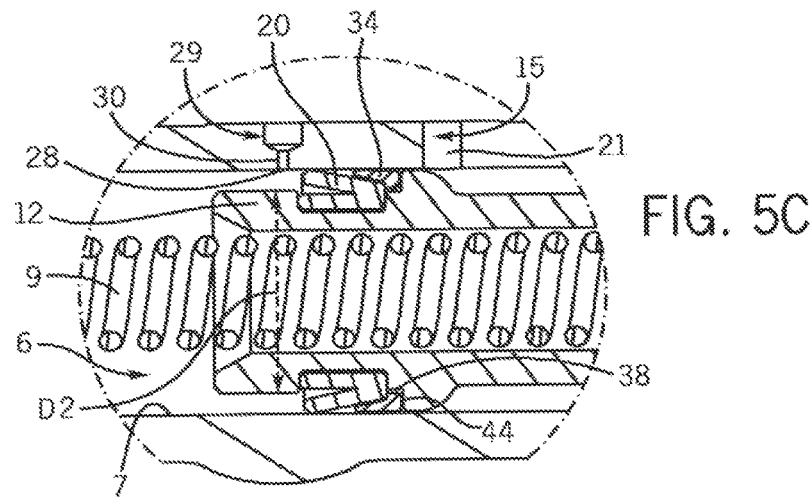
FIG. 5C is a close-up view of a portion of FIG. 5B.

FIG. 5A is a perspective view of a hand-brake hydraulic master cylinder assembly 2 having an axial bore 6 and employing the back-up ring 34, wherein the hand-brake hydraulic master cylinder assembly 2 is configured to be mounted on the handlebar 35 of various vehicles, such as a motorcycle, bicycle, ATV, snowmobile, etc. The hand-brake hydraulic master cylinder assembly 2 includes a bore 6 that extends longitudinally perpendicular to the brake actuation direction 58 and parallel with the handlebar 35. FIG. 5B is a cross-sectional side view of the hand-brake hydraulic master cylinder assembly of FIG. 5A, and FIG. 5C is a close-up view of a portion of FIG. 5B.

FIG. 6A is a perspective view of a tandem hydraulic master cylinder assembly 2 employing the back-up ring 34, wherein the tandem hydraulic master cylinder assembly 2 is intended for a dual circuit brake application, such as utilized on a Utility Terrain Vehicle (UTV). The tandem hydraulic master cylinder assembly 2 includes two pistons 12 configured to be actuated across two port timing holes 29 in a single bore 6 of the body portion 4. FIG. 6B is a cross-sectional side view of the tandem hydraulic master cylinder assembly of FIG. 6A, and FIG. 6C is a close-up view of a portion of FIG. 61B.

Figure 7A:
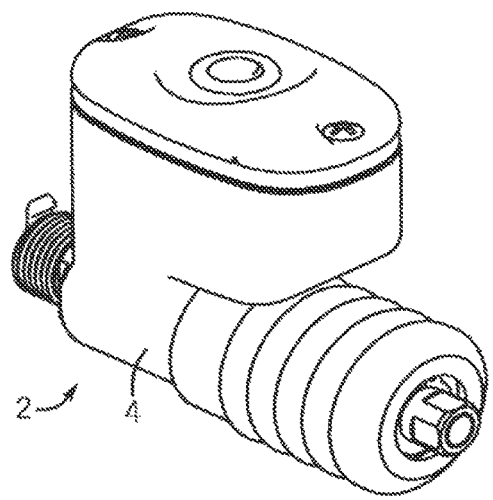
FIG. 7A is a perspective view of yet still another additional exemplary hydraulic master cylinder assembly employing an exemplary back-up ring.
Figure 7B:
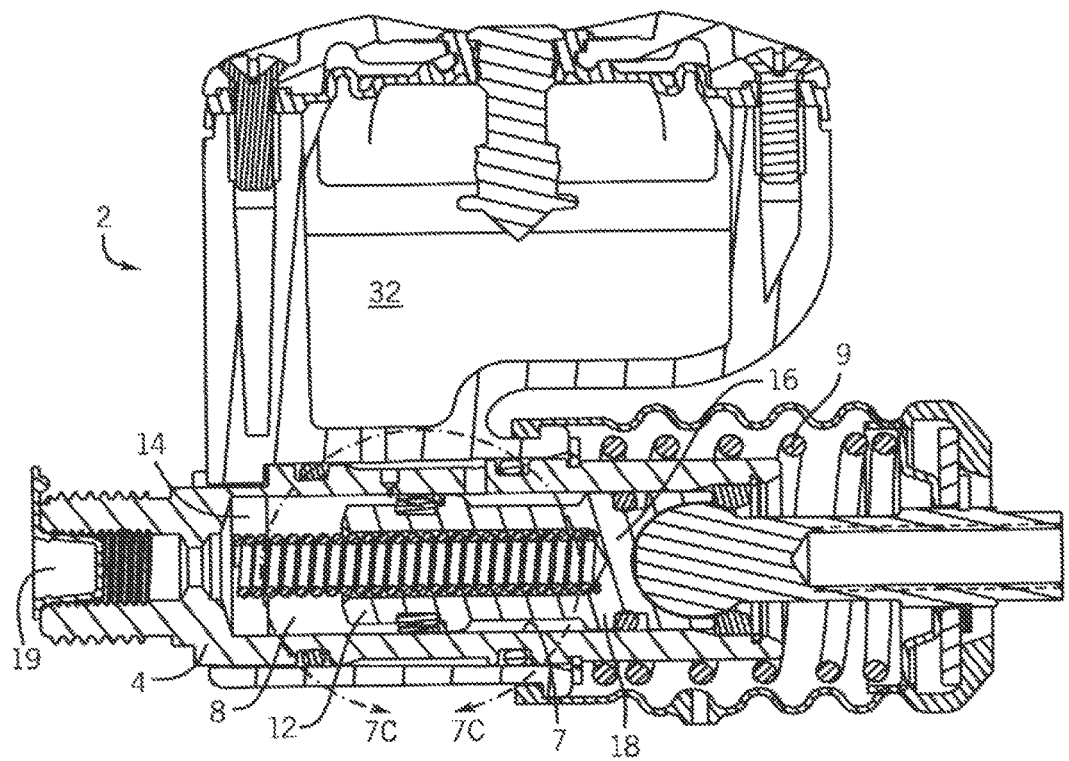
FIG. 7B is a cross-sectional side view of the hydraulic master cylinder assembly of FIG. 7A.
Figure 7C:
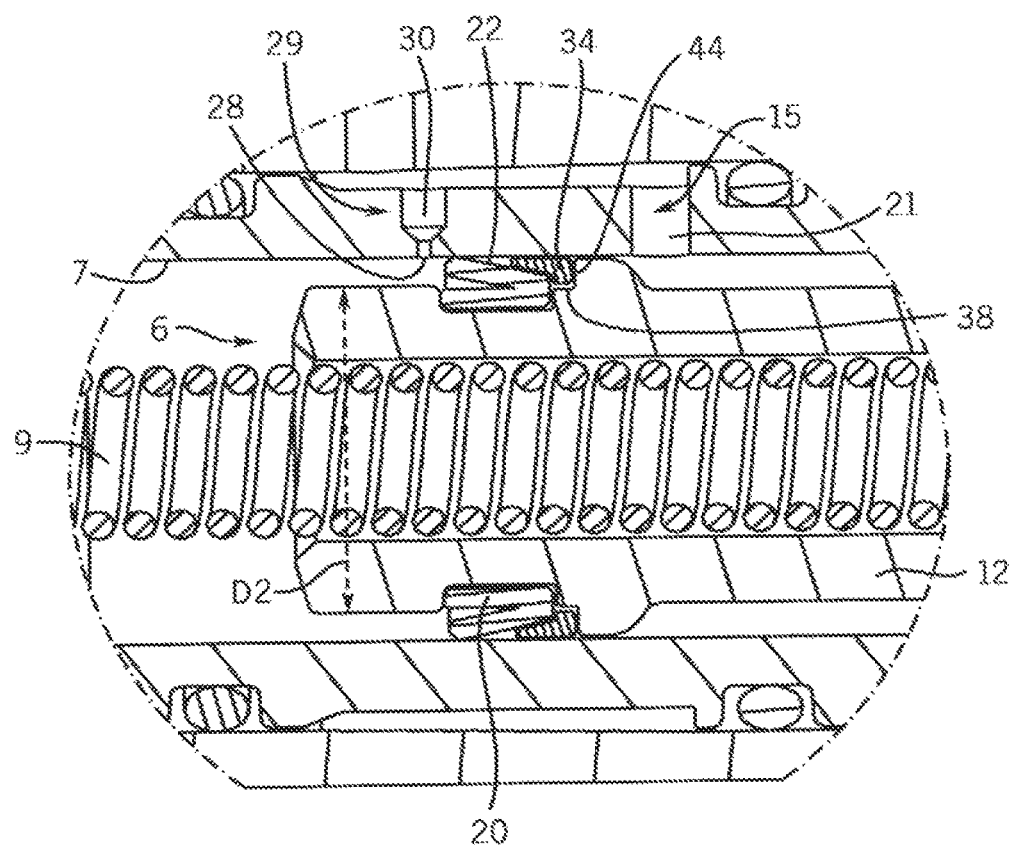
FIG. 7C is a close-up view of a portion of FIG. 7B.

FIG. 7A is a perspective view of a foot-brake hydraulic master cylinder assembly 2 employing the back-up ring 34, wherein the foot-brake hydraulic master cylinder assembly 2 includes a linear applied single circuit actuator that is actuated by the foot-brake. The foot-brake hydraulic master cylinder assembly 2 can be installed on various types of vehicles, such as a motorcycle. FIG. 7B is a cross-sectional side view of the foot-brake hydraulic master cylinder assembly of FIG. 7A, and FIG. 7C is a close-up view of a portion of FIG. 7B.

Figure 8A:
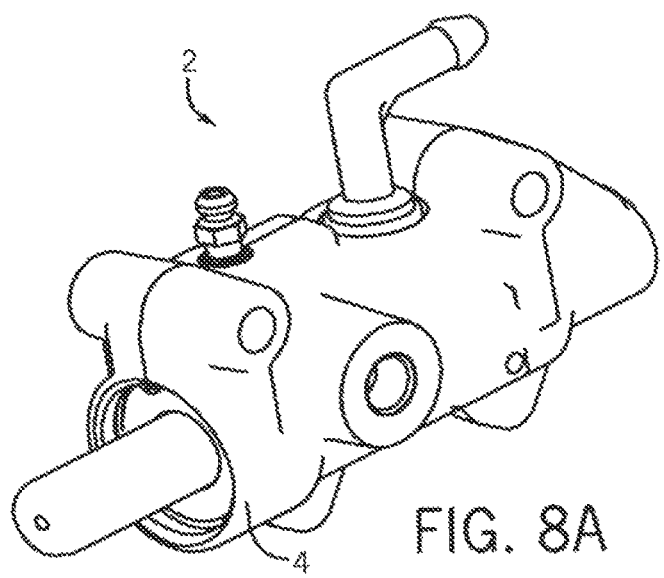
FIG. 8A is a perspective view of an additional exemplary hydraulic master cylinder assembly employing an exemplary back-up ring.

FIG. 8A is a perspective view of a dual-input rear hydraulic master cylinder assembly 2 employing the back-up ring 34, wherein the dual-input rear hydraulic master cylinder assembly 2 can be installed on various types of vehicles where a failsafe type design is desired, such as a motorcycle. The body portion of the dual-input rear hydraulic master cylinder assembly 2 is configured to allow pressure to be applied to the fluid channel 19 by either a brake actuator 9 pushing on the piston 12 or via hydraulic pressure from the brake fluid of another brake circuit on the vehicle, thereby hydraulically linking the master cylinder assembly 2 with the another master cylinder assembly. FIG. 8B is a cross-sectional side view of the dual-input rear hydraulic master cylinder assembly of FIG. 8A, and FIG. 8C is a close-up view of a portion of FIG. 8B.

It shall be generally understood that the term "back-up ring" should be broadly interpreted to include the embodiments described herein as well as variants thereof. For example, the term back-up ring is intended to encompass a structure and/or device and can comprise one or more pieces, components and/or portions. Further, the term back-up ring can be understood to include a structure and/or device that is or can be integrated with respect to another component, such as the piston 12, and again, the structure and/or device can include one or more pieces, components and/or portions.

As discussed above, the master cylinder assembly 2 can be part of a braking system for one or more of a variety of vehicles, such as a motorcycle, automobile, snowmobile, All Terrain Vehicle (ATV), Utility Terrain Vehicle (UTV), bicycle, etc. Regarding a snowmobile application in particular, to reduce premature wear of the cup seal 20 the opening 28 of the port timing hole 29 can be reduced in size to limit extrusion. This provides less surface area for extrusion, but also provides a slower brake response time. More particularly, during cold temperature operation the viscosity of the brake fluid is lowered, thereby slowing the passage of brake fluid through the reduced-size port timing hole during brake actuation. Another issue with reducing the size is that it is particularly difficult to manufacture a master cylinder with a reduced size opening due to inherent limitations of the manufacturing equipment. The use of the back-up ring 34 can be advantageous when used in a snowmobile application, as it can eliminate the need to reduce the opening of the port timing hole while also limiting extrusion of the cup seal 20.

Although the included figures depict numerous embodiments of master cylinders with back-up rings, it is specifically intended that the hydraulic brake master cylinder with back-up ring not be limited to the embodiments and illustrations contained herein, but include modified forms of those embodiments including portions of the embodiments and combinations of portions of different embodiments.

We claim:

1. A hydraulic master cylinder assembly comprising:
a master cylinder body having a bore defined at least in part by a bore wall, wherein the bore wall includes an opening for hydraulic fluid to be passed into the bore;
a piston assembly situated at least substantially in the bore, the piston assembly having a piston with a piston body and at least one cup seal situated substantially around the piston body, the cup seal situated adjacent to the bore wall so as to be in sealing engagement therewith; and
a back-up ring comprising:
 a guide surface extending along a width of an outer circumference;
 a tapered annular seal cover surface extending along an inner circumference, opposite the guide surface, wherein the seal cover surface extends between a first inner diameter and a second inner diameter as measured from a central axis, wherein the seal cover surface is configured to abut at least a portion of an outer wall of the cup seal;
 a first seating surface configured to interface with a circumferential shoulder of the piston, wherein the first seating surface is radially supported by the circumferential shoulder of the piston; and wherein the seal cover surface is positioned to at least partially cover a portion of the cup seal; and
 a second seating surface configured to abut a circumferential support wall of the piston, wherein the circumferential support wall laterally supports the second seating surface during actuation of the piston within the bore.

2. The assembly of claim 1, wherein the first seating surface extends perpendicular to the second seating surface.

3. The assembly of claim 1, wherein the piston assembly and back-up ring are installed in one of a motorcycle, automobile, snowmobile, All Terrain Vehicle (ATV), Utility Terrain Vehicle (UTV), or bicycle.

4. The assembly of claim 1, wherein the master cylinder body includes a reservoir and a port timing hole passage, wherein the port timing hole passage extends from the opening in the bore wall to the reservoir.

5. The assembly of claim 1, wherein the master cylinder body, piston assembly, and back-up ring are configured for use with at least one of a hand-lever actuator operable in conjunction with at least one of an axial bore and a radial bore, and a foot-lever actuator operable in conjunction with at least one of a tandem piston configuration and a linear applied single circuit actuator.

6. The assembly of claim 1, wherein the piston assembly is configured for dual-input actuation by both a foot-lever and a hand-lever.

7. The assembly of claim 1, wherein the piston assembly operates in conjunction with an Anti-Lock Braking System (ABS).

8. The assembly of claim 1, wherein the back-up ring prevents or substantially prevents the cup seal from being at least one of deformed by or extruded into the opening in the bore wall during at least a portion of piston actuation in the bore.

9. The assembly of claim 1, wherein a second piston assembly and a second back-up ring are provided in the bore.

10. A hydraulic master cylinder assembly comprising:
a master cylinder body having a piston bore;
a piston having a circumferential shoulder and a circumferential support wall; and
a ring comprising:
 a tapered annular seal cover surface that extends between a first diameter and a second diameter relative to a longitudinal ring central axis, wherein the seal cover surface is configured to abut at least a portion of an outer wall of a cup seal installed on the piston;
 a guide surface extending along the width of an outer circumference of the ring, wherein the guide surface at least partially abuts a bore wall of the piston bore;
 a first seating surface configured to abut the circumferential shoulder of the piston, wherein the ring is radially supported by the abutment of the first seating surface with the circumferential shoulder of the piston; and
 a second seating surface configured to abut the circumferential support wall of the piston, wherein the support wall laterally supports the ring during actuation of the piston.

11. The assembly of claim 10, wherein during actuation of the piston the cup seal is subjected to an oscillating pressure from an anti-lock braking system.

12. The assembly of claim 10, wherein the seal cover surface is tapered to match the shape of at least a portion of the outer wall of the cup seal.

13. The assembly of claim 10, wherein the master cylinder body further comprises a port timing hole passage that extends between a fluid reservoir and a port timing hole opening in the bore wall.

14. The assembly of claim 13, wherein the ring prevents at least a portion of the outer wall of the cup seal from being extruded into the port timing hole under the influence of increased pressure within the bore arising from actuation of the piston.

15. A method of operating a master cylinder comprising:
actuating a piston assembly having a piston and a cup seal situated in a bore of a master cylinder body, wherein the cup seal is in at least partial contact with a bore wall encircling the bore;
covering at least a portion of the cup seal with a seal cover portion of a ring, situated around the piston, to prevent at least a portion of the cup seal from engaging the bore wall during actuation of the piston;
abutting the bore wall with a guide surface that extends around the ring;
radially supporting a first seating surface on the ring configured to abut with a circumferential shoulder around the piston, wherein the ring is radially supported by the abutment of the first seating surface with the circumferential shoulder of the piston; and
radially supporting a second seating surface on the ring configured to abut a circumferential support wall around the piston, wherein the support wall laterally supports the second seating surface during actuation of the piston.

16. The method of claim 15, further including passing the cup seal over an opening in the bore wall during actuation of the piston via at least one of a hand-lever or foot-lever.

17. The method of claim 15, further including preventing or substantially preventing the cup seal from being at least one of deformed by or extruded into an opening in the bore wall during at least a portion of piston actuation in the bore.

18. The method of claim 15, wherein the seal cover portion of the ring is tapered relative to the guide surface.

19. The method of claim 15, further comprising subjecting the cup seal to an oscillating pressure from an anti-lock braking system during actuation of the piston.

* * * * *